W. WILMINGTON.
Car-Wheels.

No. 135,870.

Patented Feb. 11, 1873.

Witnesses.
A. Ruppert
N. Bradford

Wm. Wilmington
Inventor.
D. P. Holloway & Co
Attys

UNITED STATES PATENT OFFICE.

WILLIAM WILMINGTON, OF TOLEDO, OHIO.

IMPROVEMENT IN CAR-WHEELS.

Specification forming part of Letters Patent No. 135,870, dated February 11, 1873.

*To all whom it may concern:*

Be it known that I, WILLIAM WILMINGTON, of Toledo, in the county of Lucas and State of Ohio, have invented an Improvement in Car-Wheels for Railway Cars, of which the following is a specification:

This invention relates to an improved wheel for railway cars, the purpose being to give increased strength to such wheels without impairing their durability; and my improvement consists in making said wheels with a chill, which extends over only a portion of the tread of the wheel and over the inner portion of the flange, where the latter is curved to unite with the tread, whereby the wheel, when cooled, has less strain imparted to the particles of iron, and is, therefore, stronger, and, because stronger, may be made lighter without impairing its safety.

I have heretofore taken out Letters Patent No. 85,046, reissue No. 4,102, for a chill to be used in casting car-wheels, by means of which the tread, and that part of the flange immediately adjoining the tread, could be chilled in the operation of casting, leaving the interior portion of the flange unchilled. As the operation of chilling impairs the strength of cast-iron while it hardens the chilled surface, the effect of leaving the flange unchilled, in part, is to that extent to increase the strength of the wheel; besides, a wheel thus cast is less liable to check-crack in cooling, and is, therefore, safer, and, because fewer are lost in casting, cheaper. Since taking out the said patent, in experimenting with wheels, I have found that the wheel will be made still stronger by cutting away the chill on the lower side, so as to leave the outer portion of the rim of the tread of the wheel unchilled. This portion of the tread of the wheel does not require to be hardened, because it does not bear against the rail; but it does require to be strong, because, in running over frogs, this portion of the tread bears against the rail or point of the frog, and, with the rapid motion of the train, sustaining a hard concussion at the instant of encounter, when the weight is shifted from the flange to the outer edge of the tread of the wheel. It is, therefore, important that this part of the wheel should be tough and not brittle, as is the chilled portion. My improvement, then, consists in constructing a car-wheel with the outer portion of the flange and the outer edge of the tread of cast-iron in its normal state, the inner portion of the tread and the concave part of the flange adjoining the tread alone being chilled.

Figure 1:
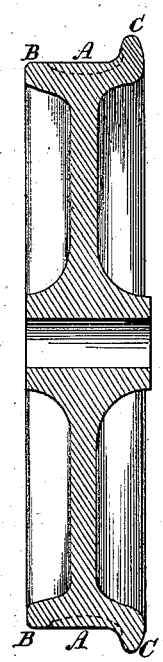
Figure 2:
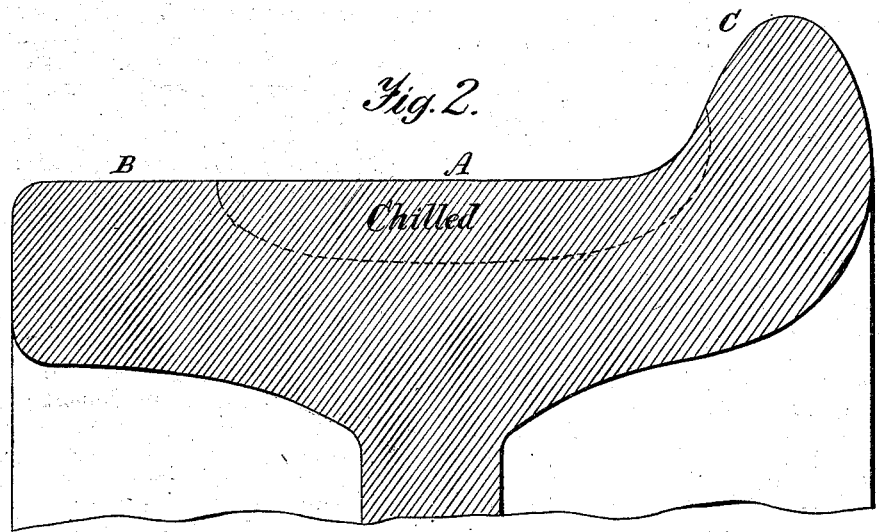

The following description will enable persons skilled in the art to manufacture my improved wheel:

In the annexed drawing, Figure 1 is a transverse section of a car-wheel, and Fig. 2 is a transverse section of the rim of a car-wheel.

In casting the wheel, I use a chill such as is set forth in my said former Letters Patent; but I cut away a portion of the chill which bears against the face of the tread in casting a wheel, so as to leave the part of the tread B and of the flange C homogeneous with the metal forming the wheel, while the part A, constituting the inner part of the tread and the adjoining concave portion of the flange, is chilled.

What I claim as my invention, and desire to secure by Letters Patent as a new article of manufacture, is—

A car-wheel having the portion A chilled, and the portions B and C homogeneous with the rest of the wheel.

In testimony whereof I have signed my name to this specification in the presence of two subscribing witnesses.

WILLIAM WILMINGTON.

Witnesses:
R. MASON,
A. RUPPERT.